United States Patent
Geisel et al.

(10) Patent No.: US 9,364,916 B2
(45) Date of Patent: Jun. 14, 2016

(54) METHOD AND DEVICE FOR PRODUCING A HOLE IN AN OBJECT

(75) Inventors: Mark Geisel, Gauting (DE); Stefan Schur, Munich (DE)

(73) Assignee: MTU Aero Engines GmbH, Munich (DE)

(*) Notice: Subject to any disclaimer, the term of this patent is extended or adjusted under 35 U.S.C. 154(b) by 773 days.

(21) Appl. No.: 13/376,069

(22) PCT Filed: May 29, 2010

(86) PCT No.: PCT/DE2010/000607
§ 371 (c)(1),
(2), (4) Date: Dec. 2, 2011

(87) PCT Pub. No.: WO2010/139304
PCT Pub. Date: Dec. 9, 2010

(65) Prior Publication Data
US 2012/0080415 A1  Apr. 5, 2012

(30) Foreign Application Priority Data
Jun. 6, 2009 (DE) .................. 10 2009 024 117

(51) Int. Cl.
B23K 26/00 (2014.01)
B23K 15/08 (2006.01)
B23K 26/04 (2014.01)

(52) U.S. Cl.
CPC ............. B23K 15/085 (2013.01); B23K 26/046 (2013.01); B23K 26/066 (2015.10); B23K 26/382 (2015.10); B23K 26/389 (2015.10); B23K 2201/001 (2013.01)

(58) Field of Classification Search
CPC .................................. B23K 26/00; B23K 26/36
USPC .................. 219/121.6, 121.61, 121.7, 121.71
See application file for complete search history.

(56) References Cited

U.S. PATENT DOCUMENTS

| | | | |
|---|---|---|---|
| 6,677,552 B1 * | 1/2004 | Tulloch et al. | 219/121.71 |
| 6,787,734 B2 * | 9/2004 | Liu | 219/121.7 |
| 7,490,664 B2 | 2/2009 | Skinner et al. | |

(Continued)

FOREIGN PATENT DOCUMENTS

| | | |
|---|---|---|
| DE | 39 34 587 A1 | 4/1991 |
| DE | 100 54 853 A1 | 8/2002 |

(Continued)

OTHER PUBLICATIONS

PCT/DE2010/000607 PCT/ISA/210, dated Oct. 20, 2010, 2 pages.

(Continued)

Primary Examiner — Dana Ross
Assistant Examiner — Ayub Maye
(74) Attorney, Agent, or Firm — Crowell & Moring LLP (57) ABSTRACT

A method and device for producing a hole in an object is disclosed. The method includes the generation of a beam for removing material such that a bottom of a borehole is placed in a focus position of the beam, and a removal of material by impingement of the beam on the bottom of the borehole. A repeated placing of the bottom of the borehole in a focus position of the beam in order to compensate for the increased depth of the hole as a result of the removal of material is combined with a step of changing a radiation characteristic of the beam when the bottom of the borehole is repeatedly placed in a focus position.

14 Claims, 7 Drawing Sheets

(56) References Cited

U.S. PATENT DOCUMENTS

| | | | |
|---|---|---|---|
| 7,807,942 B2 * | 10/2010 | Shiozaki et al. | 219/121.68 |
| 8,237,083 B2 * | 8/2012 | Walter et al. | 219/121.71 |
| 2003/0006220 A1 | 1/2003 | Cummings et al. | |
| 2004/0016730 A1 | 1/2004 | Liu | |
| 2004/0017430 A1 * | 1/2004 | Mizuyama et al. | 347/47 |

FOREIGN PATENT DOCUMENTS

| | | |
|---|---|---|
| DE | 10 2007 051 408 A1 | 5/2009 |
| JP | 11-192574 A | 7/1999 |
| WO | WO 2008/089292 A1 | 7/2008 |
| WO | WO 2009/023279 A1 | 2/2009 |
| WO | WO 2009/053031 A1 | 4/2009 |

OTHER PUBLICATIONS

German Search Report, dated Mar. 9, 2010, 5 pages.

* cited by examiner

METHOD AND DEVICE FOR PRODUCING A HOLE IN AN OBJECT

BACKGROUND AND SUMMARY OF THE INVENTION

This application claims the priority of International Application No. PCT/DE2010/000607, filed May 29, 2010, and German Patent Document No. 10 2009 024 117.5, filed Jun. 6, 2009, the disclosures of which are expressly incorporated by reference herein.

The present invention relates to the technical field of producing a hole in an object and in particular to producing a hole in an object by means of a beam for removing material.

Drilling by means of a material-removing energetic beam, such as, for example, an electron beam or laser beam drilling, has developed into a standard tool for many kinds of machining over the last few decades, for example for machining turbine blades or combustion chamber elements. These types of components may have a very high number of boreholes for example over 1,000. Beam drilling has proven to be an especially economical tool and is preferably used in particular in these applications because of the outstanding process efficiency.

Beam drilling is subject to physical limits, wherein particularly the so-called aspect ratio, i.e., the ratio between the borehole depth z and the borehole diameter d, determines the limits of the borehole geometry that may be fabricated in a manner that is stable for the process.

Various methods for carrying out these types of boreholes are known from the prior art. For example, dynamically adapting the laser focus length in laser drilling is known from U.S. Pat. No. 7,490,664. Furthermore, WO 2008/089292 shows adapting of the focus length in the case of deeper boreholes. U.S. Patent Application Publication 2004/0016730 shows carrying out an adaptation in order to focus a laser beam on a contact surface of a workpiece. Furthermore, U.S. Patent Application Publication 2003/0006220 shows continuously increasing a focus in a z direction in order to prevent damage to the substrate when layers of a substrate are being removed.

The object of the present invention is creating a concept that makes an improved execution of a production of a hole by means of beam drilling possible.

The present invention is based on the knowledge that a combination of a focus position repositioning, in which a bottom of a borehole is repeatedly placed in a focus position of the beam after a removal of material, and an additional change or modulation of a radiation characteristic of the beam, in which the bottom of a borehole is repeatedly placed in a focus position, makes it possible to produce a hole in a qualitatively higher-quality manner. In particular, it is thereby possible to produce high-quality and precise boreholes using laser beam or electron beam drilling even with a very high aspect ratio.

A method for producing a hole according to an exemplary embodiment comprises the generation of a beam for removing material such that a bottom of a borehole is placed in a focus position of the beam, and a removal of material by the impingement of the beam on the bottom of the borehole. To execute a focus position repositioning, a repeated placing of the bottom of the borehole in a focus position of the beam is carried out in order to compensate for the increased depth of the hole as a result of the removal of material. According to the invention, when the bottom of the borehole is repeatedly placed in a focus position, a radiation characteristic of the beam is changed. The changing of the radiation characteristic in this case may be a function of a momentary depth of the hole. In the case of exemplary embodiments of the present invention, the changing of the beam characteristic may include a predetermined changing or modulating of a beam caustic of the beam in such a way that with the repeated placement in a focus position, a degree of concavity of the beam caustic diminishes with an increasing depth of the hole. The change in the beam caustic with one exemplary embodiment includes a change in the focus diameter such that with increasing depth, the focus diameter becomes smaller. The modulation of the beam caustic may be accomplished by the changing of an aperture diameter, wherein the aperture diameter change may take place by introducing a selected aperture from a plurality of apertures in a beam path or by a change in the aperture diameter of a variable aperture.

With another exemplary embodiment, the change in the beam caustic may include a change in the focus diameter such that with increasing depth, the focus diameter becomes larger. In the case of one exemplary embodiment, the beam is expanded before passing through a focusing apparatus, wherein the modulation of the beam caustic includes a changing of a beam expansion. The advantage of this is a simple and cost-effective realization, wherein by a reduction in the beam expansion with an increasing depth of the hole, a depth of field (Rayleigh length) is increased, thereby enabling the beam shadowing at the borehole entrance to be reduced or completely eliminated. With one exemplary embodiment, a calculation of an optimal value for the beam expansion or an adaptive method is used to reduce the beam expansion only so much that the laser beam may be free of shadowing or largely free of shadowing in the borehole entrance. Correspondingly, with one exemplary embodiment in which an aperture diameter is changed, a calculation or an adaptive method is used to ensure that when the beam enters the hole there is no shadowing or only slight shadowing.

In one exemplary embodiment, a focus length of the beam, i.e., the distance of the focus point from the beam-generating drilling tool or focusing optics of the beam-generating drilling tool, is unchanged or substantially unchanged. This means that when the bottom of the borehole is repeatedly placed in a focus position, the adaptation to the depth of the borehole is achieved by a spatial change in the position of the object, while the drilling tool itself does not need to change its spatial position.

The beam for removing the material may be a laser beam or an electron beam in an exemplary embodiment.

Moreover, with one exemplary embodiment, the invention creates a device for producing a hole in an object wherein the device includes a radiation source for generating a beam for removing material and an apparatus for placing a bottom of borehole in a focus position of the beam. The apparatus for placing a bottom of borehole in a focus position in this case is set up such that after removing material on the bottom of a borehole, a repeated placing of a bottom of a borehole in a focus position is carried out. Furthermore, an apparatus for changing a radiation characteristic when the bottom of the borehole is repeatedly placed in a focus position is provided with the device. The device for changing the radiation characteristic in this case may be set up to carry out the change in the radiation characteristic as a function of a momentary depth of the hole. The apparatus for changing the radiation characteristic may furthermore be set up to modulate a beam caustic of the beam. In addition, an aperture device may be provided, wherein the aperture device is set up to change an aperture diameter when the bottom of the borehole is repeatedly placed in a focus position.

In the case of one exemplary embodiment, a device may have a focusing apparatus and an apparatus for expanding the beam before passing through the focusing apparatus, wherein the apparatus for changing the radiation characteristic is set up to change the beam expansion before passing through the focusing apparatus. The apparatus for changing the radiation characteristic maybe set up to reduce the expansion of the beam with increasing depth of the hole.

Furthermore, a controller may be provided for the radiation source in order to increase the energy density of a radiation on which the beam is based when the bottom of the borehole is repeatedly placed in a focus position. In particular, in the case of a drilling with beam pulses, the energy of a beam pulse is increased when the bottom of the borehole is repeatedly placed in a focus position, i.e., during focus position repositioning.

The device may be designed to modulate a beam caustic in such a way that there is no shadowing or no substantial shadowing when entering the hole.

The device may furthermore have an arithmetic unit for calculating a modulation of the beam caustic as a function of a momentary depth of the hole.

Furthermore, the device may be set up to carry out a spatial change in the position of the object when the bottom of the borehole is repeatedly placed in a focus position.

Moreover, the present invention creates a computer program with a program code for execution, if the computer program runs on a computer, a method for controlling a production of a hole by means of a beam for removing material in an object having the step of a control of a change in a radiation characteristic of the beam as a function of a momentary depth of a bottom of a borehole of the hole, when the bottom of the borehole is repeatedly placed in a focus position.

Preferred exemplary embodiments of the present invention will be explained in more detail in the following making reference to the enclosed drawings.

DETAILED DESCRIPTION OF THE DRAWINGS

Before preferred exemplary embodiments are explained in detail, at this point a fundamental physical observation of the present invention should be made first. As already described above, it is difficult to produce qualitatively high-quality boreholes for drilling geometries with a drilling aspect ratio. In practice, it could be observed here that with an aspect ratio of approx. z/d=15 technological difficulties occur more often. These difficulties are expressed in the form of an impermissibly high recast layer, i.e., melt deposits on the walls of the borehole.

It was shown here that essentially the aspect ratio, and not as one would have expected just the borehole depth and the borehole diameter, appears to be decisively responsible for the occurrence of an increased recast layer. In other words, starting at a very high aspect ratio, melt deposits occur on the walls of the borehole to an increasing degree always in the case of geometrically similar boreholes.

This may be explained by the fact that for the increasing melt deposits with an increasing aspect ratio, there is too low an energy density at the bottom of a borehole. If insufficient energy is available at the bottom of a borehole, then an interaction between the object, e.g., of a workpiece, and the laser beam is no longer sufficiently high to ensure an efficient expulsion of molten metal from the borehole. The energy loss that can be observed with an increasing aspect ratio is supposed to be explained with the example of the so-called multiple reflection.

When the laser beam enters the borehole, a large portion of the laser radiation is reflected on the walls of the borehole because of the small, but present beam divergence and also because of the low borehole conicity that is normally present. These reflections repeat themselves several times the deeper the laser beam penetrates into the borehole. This energy transport mechanism is responsible for making it possible to realize comparatively high aspect ratios and/or low heat-affected zones such as those during welding (for example during laser-beam deep penetration welding) in the case of drilling, welding or cutting applications.

The multiple reflections may not guarantee a 100% energy transport into the borehole depth, because with each reflection a small portion of the laser radiation is guided into the workpiece via so-called Fresnel absorption. In other words, the deeper the borehole, the less energy is available at the bottom of a borehole. Simulation calculations show that not just the borehole depth, rather the aspect ratio is decisive as a characteristic geometric parameter for the energy.

A similar situation is known, for example in the case of laser deep-penetration welding, see, e.g., Geisel, M., "Process Control in Laser Beam Welding with Non-linear Dynamics Methods", Bamberg: Meisenbach 2002.

Figure 1A:
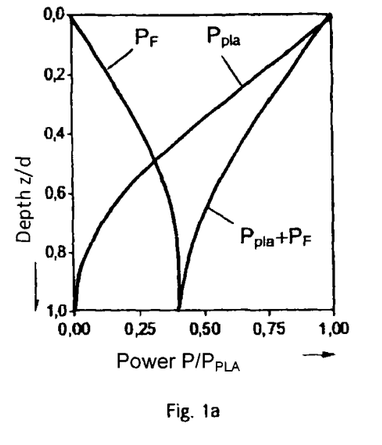
FIGS. 1a and 1b illustrate a depth-dependent laser power or energy flux density for the detailed explanation of the present invention.
Figure 1B:
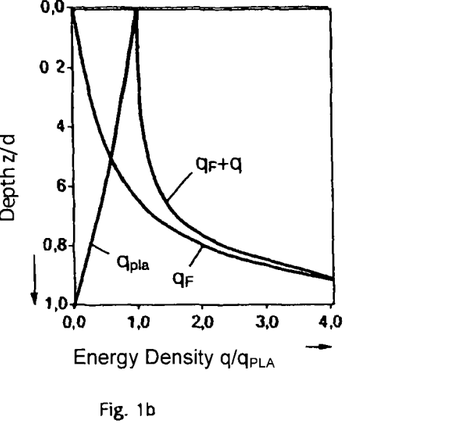

FIGS. 1a and 1b show simulations for these types of laser-beam deep penetration welding, in which a detailed calculation of different energy proportions was carried out.

FIG. 1a shows a power loss $P_F$ through a Fresnel absorption for a conical welded seam, wherein the figure shows that solely the aspect ratio z/d is decisive for the progression. Correspondingly FIG. 1b depicts an energy flux density, which is likewise solely dependent on the aspect ratio z/d.

Because the geometric relationships in the interaction zone between the workpiece and the laser beam are very similar to beam drilling in the case of laser deep-penetration welding, the information provided below may be applied to a large extent to beam drilling.

As evidenced by the foregoing explanations, sufficient energy must therefore be made available to the bottom of a borehole in order to prevent the drilling quality from being diminished by the loss of energy, which may be described by way of example by the Fresnel absorption, which is decisively influenced in turn by the aspect ratio of the borehole.

In accordance with the knowledge of the present invention, this type of sufficiently providing energy on the bottom of a borehole is achieved in exemplary embodiments of the present invention, in that a combination of a focus position repositioning and a change in the radiation characteristic is carried out.

This procedure has substantial advantages over other possible solutions.

For example, in the case of another approach, a pulse energy of a drilling beam is increased, whereby more energy would be available at the bottom of a borehole. However, it has been shown that the laser pulse energy decisively determines a borehole diameter so that an increase in pulse energy would result in an increase in the borehole diameter, which is not acceptable as a rule, for example because this makes it impossible to comply with drawing specifications of customers.

Furthermore, a pulse length of a beam pulse could also be increased, whereby more energy would be available at the bottom of a borehole. However, it has been shown here in practical experience that a longer pulse duration also makes more time available for energy transport in the workpiece. Thus, the recast layer increases from material melting because of the longer pulse duration, which in turn adversely affects quality.

In addition, a pulse frequency of the beam could also be increased, whereby on a time average more energy would be made available at the bottom of a borehole. However, based on practical experience the pulse frequency may not be increased arbitrarily, because the maximum permissible drilling pulse frequency is essentially determined by the melt dynamics. In other words, if melt particles are still located inside the borehole in the case of too great an increase in the frequency, this means that a drilling pulse interacts with a melt drop, which was induced by the preceding drilling pulse, which produces a considerable energy loss.

In contrast to the foregoing approaches, the present invention makes use of a concept in which, a focus position repositioning is carried out in combination with a change in a radiation characteristic to increase the energy at the bottom of a borehole. The change in the radiation characteristic may be a change or modulation of the geometric shape of the laser beam, i.e., of a beam caustic modulation, wherein this may also effect a change in the radiation energy.

Figure 2:
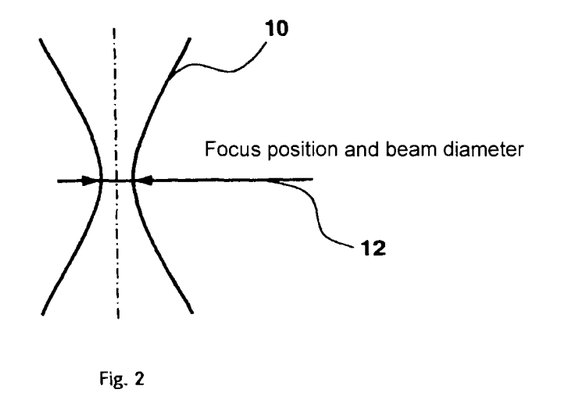
FIG. 2 is a representation of beam caustic in the form of a sketch.

In this connection, FIG. 2 shows a schematic representation of a beam caustic to explain the terminology used in the following.

FIG. 2 shows the shape of a beam caustic 10, which has a concave shape. The beam caustic 10 has a focus position, under which a laser beam range with the highest energy density is present, thereby producing the focus position with the smallest beam diameter 12 of the beam caustic (focus diameter).

Figure 3:
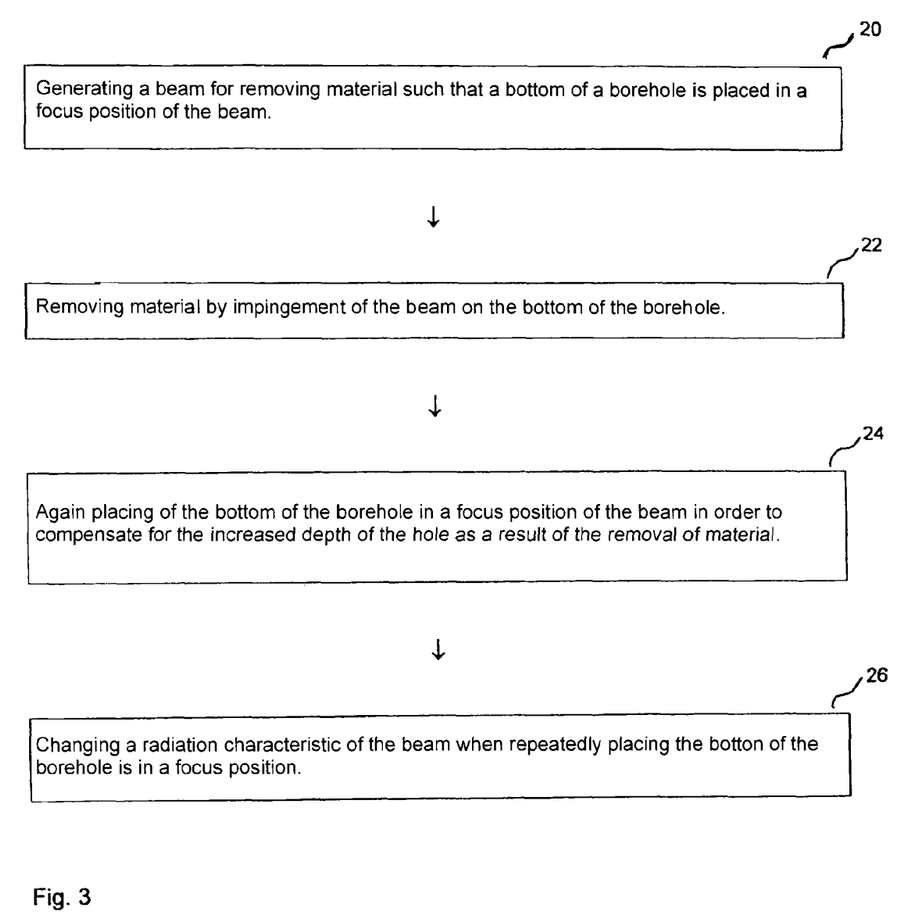
FIG. 3 is a flow chart according to an exemplary embodiment.

Making reference to FIG. 3, a fundamental process sequence for producing a hole according to the present invention will now be explained.

In a first step 20, a beam is generated for removing material, wherein a bottom of a borehole is placed in a focus position of the beam. The beam may be an electron beam or a laser beam for example. In this step, "bottom of a borehole" may be understood both as a previously unprocessed surface of the workpiece on which the hole is supposed to be generated as well as a bottom of a borehole of a hole already predrilled in the object.

In a step 22, material is removed by an impingement of the beam on the bottom of a borehole. In one exemplary embodiment, the removal of material may take place by means of a few drilling pulses in order to first produce a blind hole in a previously unprocessed surface. In step 24, a focus position repositioning is carried out, i.e., a repeated placing of the bottom of a borehole in a focus position of the beam to compensate for an increased depth of the hole due to the removal of material. This may be accomplished in the case of one exemplary embodiment in that the drilling process is briefly interrupted and the object or the workpiece is displaced in the direction of the focus position. This process, i.e., the removal of material on the bottom of the borehole in conjunction with the focus position repositioning may be repeated several times until the borehole has been completely created. In some exemplary embodiments, the borehole may only extend partially into the object or penetrate the object completely. Furthermore, in other exemplary embodiments, the focus position repositioning described above may be carried out continuously, wherein suitable control processes and computer programs are provided for control.

Through the focus position repositioning described above, the "tool tip" of the beam is carried further into the borehole. This makes it possible in particular to drill holes with a high aspect ratio, i.e., a ratio of z/d of over 15. The number of multiple reflections is reduced by the method, whereby more energy is available on the bottom of a borehole. However, because of focus position repositioning without adapting the radiation characteristic, the beam waist migrates further into the workpiece, and large parts of the beam are shadowed at the entrance to the borehole, because the laser beam expands further due to a beam divergence above the focus, as depicted in FIG. 4b as compared to FIG. 4a.

Figure 4A:
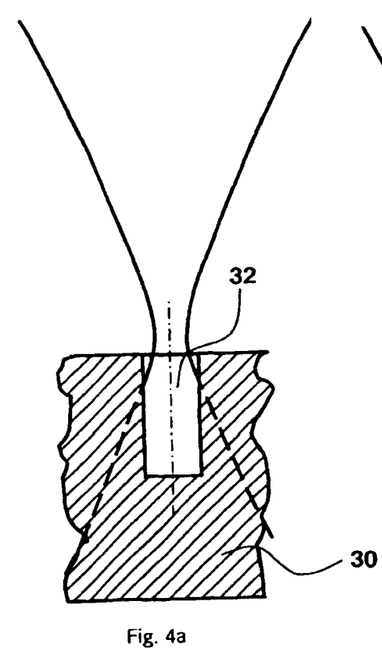
FIGS. 4a and 4b are schematic representations of a focus position repositioning according to an exemplary embodiment of the present invention.

FIG. 4a shows an object 30 in which a hole 32 has already been drilled in the form of a blind hole. The beam caustic in this case is adjusted such that a focus position lies in the area of the hole entrance on the surface of the object 30.

Figure 4B:
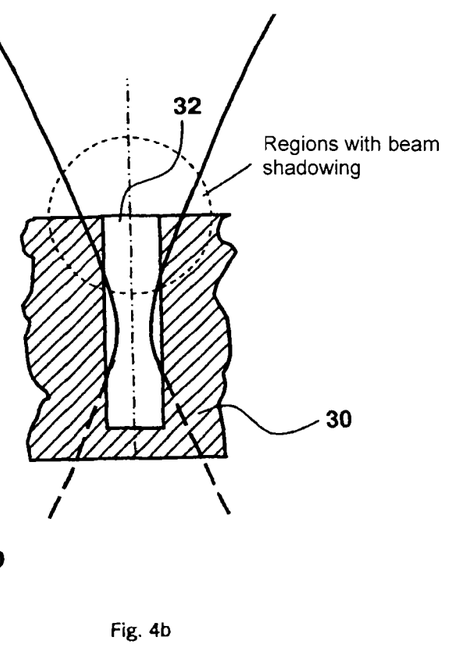

FIG. 4b shows a focus position repositioning wherein a change in the radiation characteristic is not carried out. As FIG. 4b shows, the focus position point is displaced in a direction into the object, thereby producing a beam shadowing on a surface of the object 30 in the vicinity of the hole 32. To prevent such a beam shadowing, therefore with the method explained in FIG. 3, a change in a radiation characteristic of the beam is carried out when the bottom of the borehole is repeatedly placed in a focus position. As will be explained in more detail below, carrying out the change in the radiation characteristic may be accomplished with exemplary embodiments in different ways. In the case of exemplary embodiments, the change in the radiation characteristic may include a change in the spatial beam geometry, i.e., of the beam caustic, wherein this may be carried out however in exemplary embodiments in combination with a change in the radiation energy, which is transported by the beam. For example, the energy density of a radiation pulse, e.g., the energy density of a laser pulse or an electron pulse, may also be increased in order to compensate for changes in the energy of the beam, which are generated by the realization of the geometric change in the beam, e.g., an additional blocking of portions of the radiation or radiation modes.

After having now explained a fundamental exemplary embodiment of a method, a device for realizing the method described above will be explained in greater detail in the following.

Figure 5:
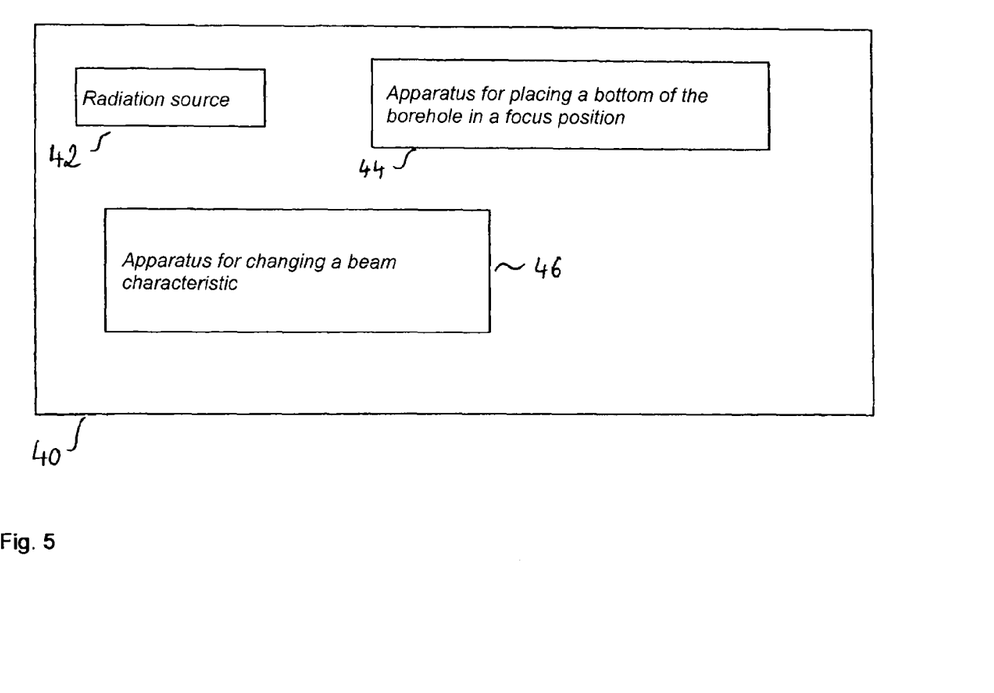
FIG. 5 is a schematic representation of an arrangement for producing a hole according to an exemplary embodiment of the invention.

FIG. 5 shows a block diagram of a device 40 for producing a hole in a object. The device 40 has a radiation source 42, which generates a radiation for producing a beam for removing material. The device 40 furthermore has an apparatus 44 for placing a bottom of a borehole in a focus position. The apparatus in this case is set up such that after removing material on the bottom of a borehole, a repeated placing of the now new bottom of a borehole in a focus position is carried out.

Furthermore, the device 40 features an apparatus 46 for changing a beam characteristic when the bottom of the borehole is repeatedly placed in a focus position. As already described above, the changing of the radiation characteristic may include a change or a modulation of a beam caustic, wherein an aperture apparatus or a telescope device may be used to expand a beam in order to carry out the required modulation of the beam caustic.

Making reference to FIGS. 6, 7 and 8a, 8b, exemplary embodiments in which a change in the radiation characteristic takes place through a change in an aperture diameter will now be explained.

Figure 6:
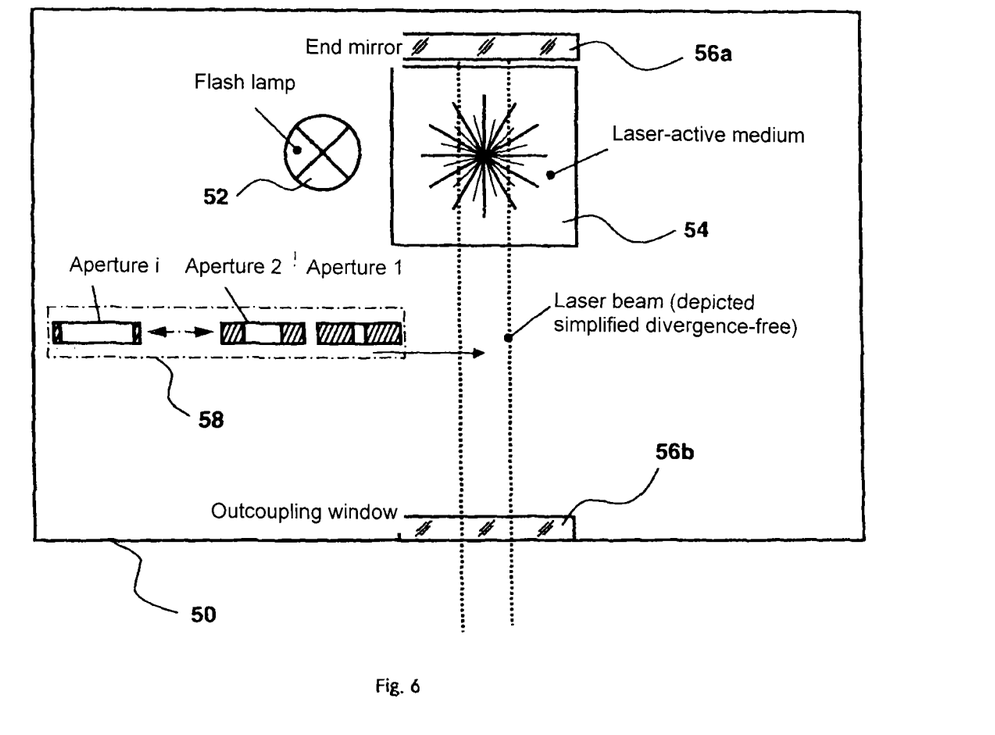
FIG. 6 is a schematic representation of an arrangement for generating a laser drilling beam in which the different apertures are placed in a beam path.
Figure 7:
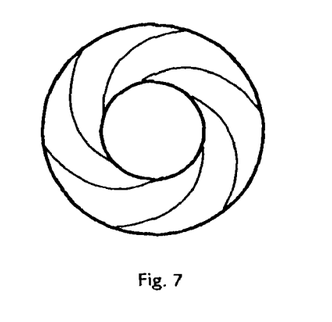
FIG. 7 is a schematic representation of a variable aperture according to an exemplary embodiment of the present invention.

FIG. 6 shows a laser beam generating device 50 with a flash lamp 52 and a laser-active medium 54 for generating a laser radiation. The flash lamp produces an excitation of the laser-active medium, which may thereby be put into a mode, in which the laser radiation, i.e., coherent light, is generated. The device 50 has a first mirror 56a and a second outcoupling mirror 56b, through which a laser beam generated by the laser-active medium may be coupled out. The laser beam generating device 50 further has an aperture apparatus 58, which includes a plurality of apertures 1, 2, to i, which can be brought into the generated laser beam. The apertures of the aperture apparatus 58 each feature a different aperture diameter so that a predetermined beam caustic can be generated by introducing a selected aperture. The apertures may be put into the beam path automatically, wherein in the case of a focus position repositioning as described above, a new aperture is put into the beam path. With the increasing depth of the hole, a selected aperture has a smaller diameter so that the raw beam of the laser is correspondingly reduced. It must be noted in this case, that a laser pulse has a lower energy on the object or workpiece, because a portion of the raw beam is absorbed by the aperture. In order to be able to guarantee energetically constant conditions on the object, in the case of one exemplary embodiment, a laser pulse energy is correspondingly increased when using in a smaller aperture. Appropriate controls, which may be computer programmable, may be provided for carrying out this type of energetic change in the laser radiation.

In some exemplary embodiments, the use of an aperture described above may not just produce a reduction in the beam diameter with increasing depth of the hole, but also an increase in beam quality, because only low-order modes are oscillated. In other words, through the use of an aperture, the divergence angle is likewise reduced and the so-called Rayleigh length, i.e., the depth of field, is increased.

Figure 8A:
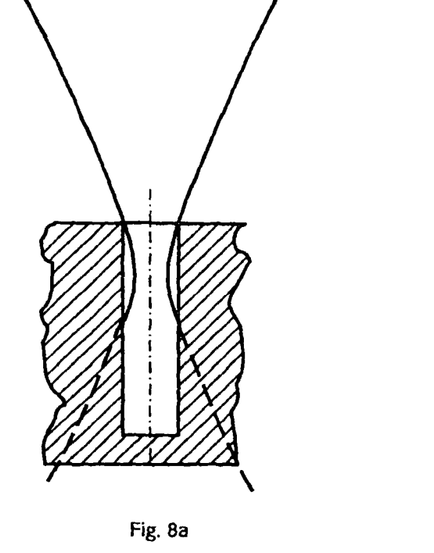
FIGS. 8a and 8b are schematic representations to explain a modulation of the beam caustic with the change in an aperture diameter.
Figure 8B:
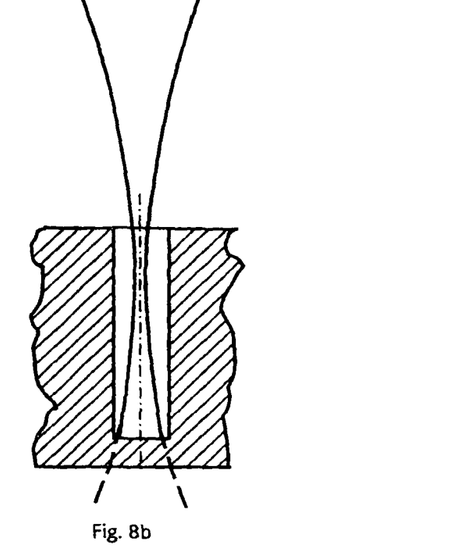

A comparison of the beam caustic in the region of the object with and without an aperture is depicted in FIG. 8a and FIG. 8b. Calculations of the beam caustic and the relevant formulae for analytical derivatives are known to a person skilled in the art from the pertinent technical literature, wherein reference is made for example to the following technical literature: Huegel, H., "Laser Tools", Teubner, Stuttgart, 1992 and Ifflaender, R., "Solid-state Lasers for Materials Processing", Springer, Berlin, Heidelberg, New York, London, Paris, Tokyo, Hong Kong, 1990. As FIGS. 8a and 8b show, when changing the aperture diameter, a lower degree of concavity (degree of outward curvature) of the beam caustic and a reduced minimal beam diameter are achieved, as depicted in FIG. 8b, compared with a beam caustic without an aperture, as depicted in FIG. 8a. FIGS. 8a and 8b each show the focus position at the height of a surface of the object 30, wherein it is evident from FIG. 8b that a displacement of the focus position in the direction into the object may be carried out without the beam being shadowed at an opening of the hole 32. A further exemplary embodiment for changing an aperture diameter includes an automatically variable aperture, e.g., an automatic iris aperture, as shown schematically in FIG. 7. Such an approach is suitable with exemplary embodiments in which a laser beam diameter is being influenced continuously to a large extent.

Appropriate controls and computer programs for carrying out the continuous automatic change in the aperture diameter and for calculating an aperture diameter as a function of a depth of the hole are likewise provided in the exemplary embodiments.

A further exemplary embodiment in which a beam caustic of a laser beam is accomplished by changing an expanded laser beam before a focusing apparatus, will be explained in greater detail below making reference to FIGS. 9 and 10a, 10b. In the case of these exemplary embodiments, the beam caustic change is carried out by means of a variable telescope, which is integrated into the beam path.

Figure 9:
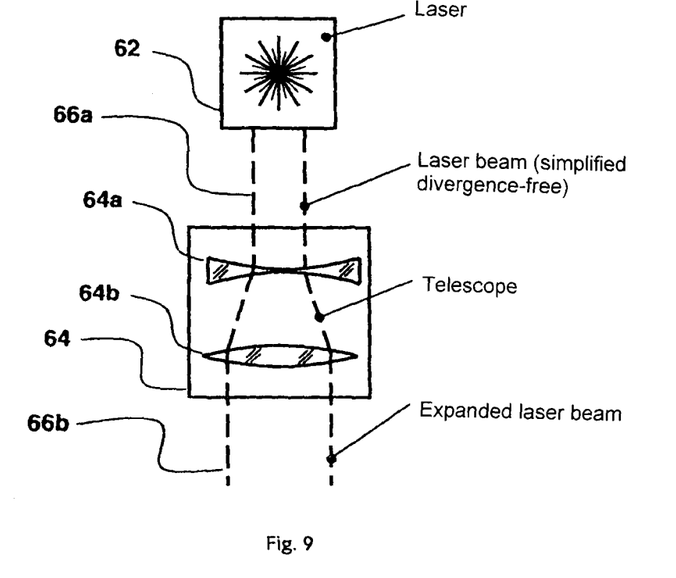
FIG. 9 is a schematic representation of an exemplary embodiment by means of a beam expansion.
Figure 10A:
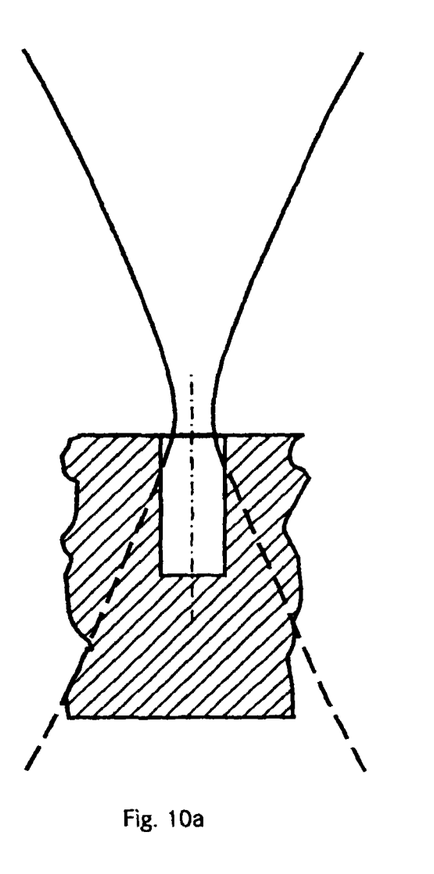
FIGS. 10a and 10b are schematic representations of beam caustics with a change in a beam expansion.
Figure 10B:
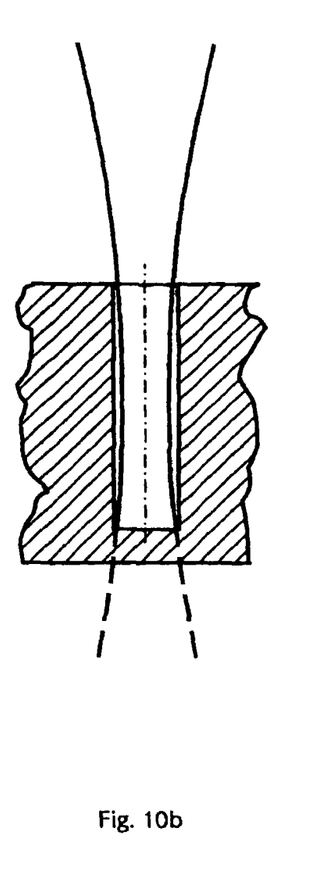

FIG. 9 depicts a laser beam generating device having a laser 62 and a telescope arrangement 64 for expanding the laser beam before passing through a focusing apparatus (focusing optics) such as, for example, a focusing lens. The telescope device 64 has a first lens 64a and a second lens 64b, which cause the raw laser beam 66a entering from the laser 62 to be expanded and to exit the telescope device 64 as an expanded laser beam 66b. The expanded beam then passes through the focusing apparatus, as already explained above. With reference to the technical literature already mentioned above, according to the pertinent lens formulae (ABCD law) it can be shown that the beam diameter diminishes after the focusing optics the more the beam is expanded. In this case, however, the depth of field also is reduced, whereby FIGS. 10a and 10b schematically show the respectively different situations for different telescope expansions. As FIG. 10b shows, the beam caustic has a lower concavity with a lower beam expansion in comparison to a beam caustic with a large beam expansion. It must be noted, however, that in contrast to the foregoing exemplary embodiment, the beam diameter increases in the region of the object by means of a change in the beam caustic based on an aperture change. As a result, with an increasing depth of the hole, a degree of concavity of the beam caustic is in fact reduced, but the focus diameter increases. With some exemplary embodiments, the beam expansion is only reduced so much that the laser beam may enter the borehole that is already present free of shadowing or largely free of shadowing.

In the case of such an exemplary embodiment, the drilling process is thus begun with the highest possible beam expansion, i.e., a low focus diameter. When carrying out the focus position repositioning, as described above, the beam expansion is simultaneously reduced, thereby increasing the Rayleigh length (depth of field) and reducing or completely eliminating the beam shadowing at the entrance to the borehole. Also in the case of this exemplary embodiment, an automatic calculation may be carried out of an optimum value for the beam expansion in order to achieve an optimum beam caustic. The exemplary embodiment of changing the beam caustic by means of a change in the beam expansion makes a target modulation of the beam caustic possible with lower complexity and a more cost-effective realization.

Although in the exemplary embodiments explained in the foregoing, special embodiments such as those in the form of a laser beam were explained, it is understood that the present invention is not limited to such types of beam forms, but may also include other beam forms, e.g., electron beam forms.

It is furthermore noted that in terms of the present application the term "object" may be broadly comprehensive and may include both a workpiece such as a metal object, an object made of carbon material, composite material or ceramic material, etc., as well as other objects.

The invention claimed is:

1. A method for producing a hole in an object comprising the steps of:
   generating a beam;
   placing a bottom of a borehole in a focus position of the beam;
   removing material at the bottom of the borehole by impingement of the beam on the bottom of the borehole;
   repeatedly re-placing the bottom of the borehole in the focus position of the beam after the step of removing material; and
   changing a radiation characteristic of the beam after each step of repeatedly re-placing, wherein the step of changing the radiation characteristic includes modulating a beam caustic of the beam.

2. The method according to claim 1, wherein the step of changing the radiation characteristic is performed as a function of a depth of the borehole.

3. The method according to claim 1, wherein the modulating lowers a degree of concavity of the beam caustic.

4. The method according to claim 1, wherein the modulating lessens a focus diameter of the beam caustic.

5. The method according to claim 1, wherein the modulating includes changing of an aperture diameter.

6. The method according to claim 1, wherein the modulating increases a focus diameter of the beam caustic.

7. The method according to claim 1, wherein the modulating includes expanding the beam.

8. The method according to claim 1, wherein the step of changing a radiation characteristic of the beam increases an energy density of the beam.

9. The method according to claim 1, wherein the step of re-placing results in the beam entering the borehole such that there is no shadowing of the beam.

10. The method according to claim 1, wherein the step of re-placing includes a spatial change in a position of the object.

11. The method according to claim 1, wherein the beam is a laser beam or an electron beam.

12. The method according to claim 5, wherein the changing of the aperture diameter includes selecting an aperture from a plurality of apertures and introducing the selected aperture into a beam path.

13. The method according to claim 5, wherein the changing of the aperture diameter includes varying a variable aperture.

14. The method according to claim 7, wherein the beam is expanded before passing through a focusing apparatus.

* * * * *